US011913538B2

(12) United States Patent
Smook

(10) Patent No.: US 11,913,538 B2
(45) Date of Patent: Feb. 27, 2024

(54) INTEGRATED DESIGN OF A SUN SHAFT

(71) Applicants: ZF FRIEDRICHSHAFEN AG, Friedrichshafen (DE); ZF WIND POWER ANTWERPEN N.V., Lommel (BE)

(72) Inventor: Warren Smook, Huldenberg (BE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 0 days.

(21) Appl. No.: 18/006,729

(22) PCT Filed: Jun. 28, 2021

(86) PCT No.: PCT/EP2021/067600
§ 371 (c)(1),
(2) Date: Jan. 25, 2023

(87) PCT Pub. No.: WO2022/022919
PCT Pub. Date: Feb. 3, 2022

(65) Prior Publication Data
US 2023/0250871 A1 Aug. 10, 2023

(30) Foreign Application Priority Data
Jul. 31, 2020 (DE) ..................... 10 2020 209 679.1

(51) Int. Cl.
*F16H 3/48* (2006.01)
*F16H 57/08* (2006.01)
*F16H 57/02* (2012.01)

(52) U.S. Cl.
CPC ............ *F16H 57/082* (2013.01); *F16H 3/48* (2013.01); *F05B 2260/40311* (2013.01); *F16H 2057/02078* (2013.01)

(58) Field of Classification Search
CPC .. F16H 57/082; F16H 3/48; F16H 2057/0278; F16H 2057/085; F05B 2260/40311
(Continued)

(56) References Cited

U.S. PATENT DOCUMENTS 4,020,716 A    5/1977  Toth et al.
4,158,971 A *  6/1979  Szalai ............... B60K 17/046
                                              74/391
(Continued)

FOREIGN PATENT DOCUMENTS

DE       19917607 A1   11/2000
DE    102005045614 A1    5/2006
(Continued)

OTHER PUBLICATIONS

English translation of DE102016222452A1; http://translationportal.epo.org; Aug. 2, 2023 (Year: 2023).*

*Primary Examiner* — Roger L Pang
(74) *Attorney, Agent, or Firm* — LEYDIG, VOIT & MAYER, LTD.

(57) ABSTRACT

A wind turbine transmission including a first planetary stage and a second planetary stage, wherein a sun gear of the first planetary stage and a planet carrier of the second planetary stage are interconnected for conjoint rotation by means of a spline joint, the sun gear integrally forms an internal toothing, and a first web of the planet carrier or a sun shaft integrally connected to the first web integrally forms an external toothing of the spline joint.

7 Claims, 1 Drawing Sheet

(58) Field of Classification Search
USPC .................................................. 475/331, 337
See application file for complete search history.

(56) References Cited

U.S. PATENT DOCUMENTS

| | | | | |
|---|---|---|---|---|
| 4,901,602 | A * | 2/1990 | Matoba | F16H 1/36 |
| | | | | 475/345 |
| 6,368,244 | B1 | 4/2002 | Hosle et al. | |
| 11,015,683 | B2 * | 5/2021 | Suyama | F16H 1/46 |
| 2015/0065291 | A1 | 3/2015 | Kiesenbauer | |

FOREIGN PATENT DOCUMENTS

| | | | | |
|---|---|---|---|---|
| DE | 202012004029 U1 | 5/2012 | | |
| DE | 102016222452 A1 | 5/2018 | | |
| DE | 102018206103 A1 | 10/2019 | | |
| EP | 3464894 B1 * | 2/2020 | ............ | F03D 15/00 |
| EP | 3663611 A1 | 6/2020 | | |

\* cited by examiner

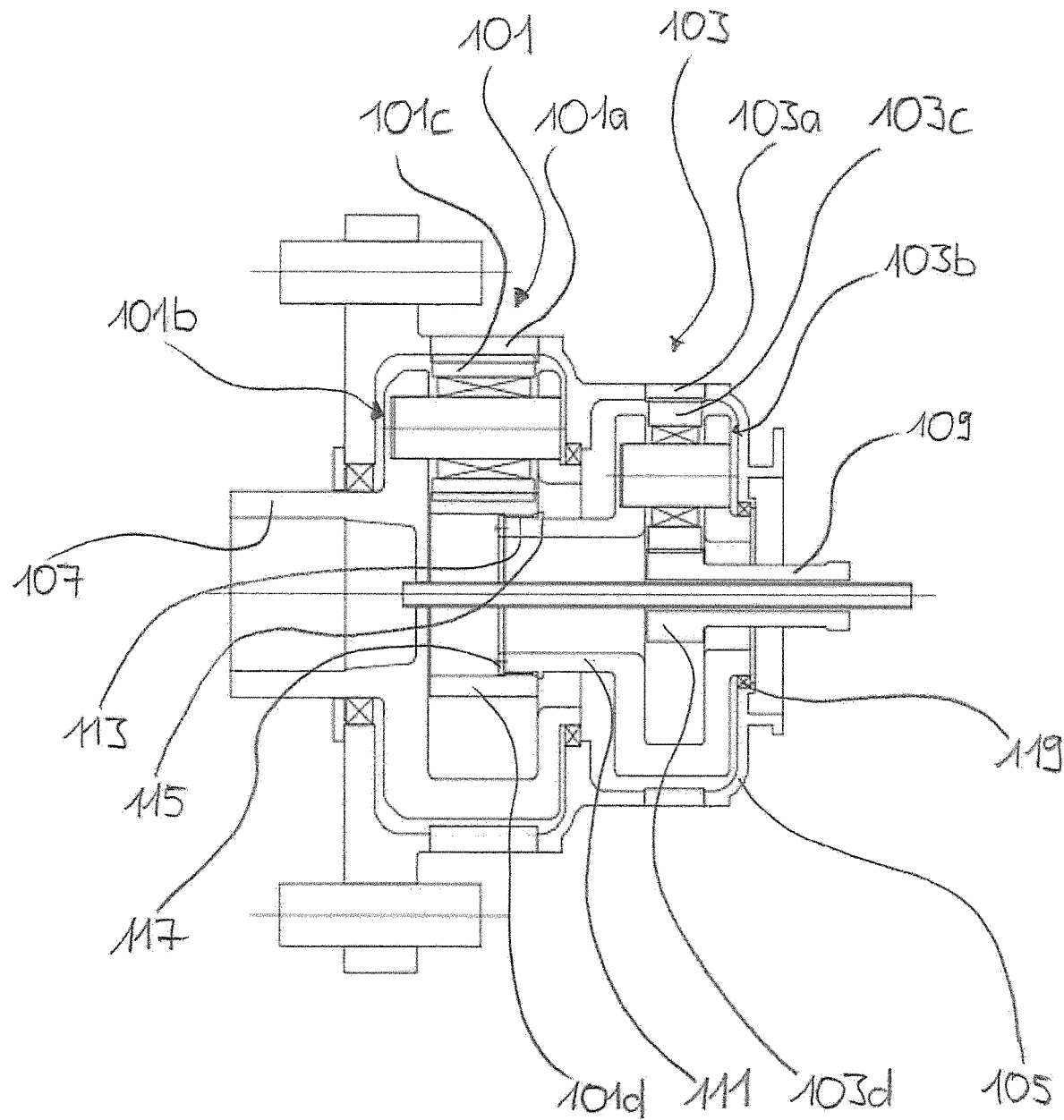

INTEGRATED DESIGN OF A SUN SHAFT

CROSS REFERENCE TO RELATED APPLICATIONS

This application is a U.S. National Phase application under 35 U.S.C. § 371 of International Application No. PCT/EP2021/067600, filed on Jun. 28, 2021, and claims benefit to German Patent Application No. DE 10 2020 209 679.1, filed on Jul. 31, 2020. The International Application was published in German on Feb. 3, 2022, as WO 2022/022919 A1 under PCT Article 21(2).

FIELD

The invention relates to wind turbine transmissions having planetary gear stages.

BACKGROUND

Wind turbine transmissions having two planetary stages are known from the prior art. A first planetary stage has a rotatable sun gear, which is integrally connected to a sun shaft. By means of a spline joint, the sun shaft drives a rotatably mounted planet carrier of a second planetary stage.

SUMMARY

In an embodiment, the present disclosure provides a wind turbine transmission comprising a first planetary stage and a second planetary stage, wherein a sun gear of the first planetary stage and a planet carrier of the second planetary stage are interconnected for conjoint rotation by means of a spline joint, the sun gear integrally forms an internal toothing, and a first web of the planet carrier or a sun shaft integrally connected to the first web integrally forms an external toothing of the spline joint.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 shows a wind turbine transmission.

DETAILED DESCRIPTION

In an embodiment, the present invention provides an improved transmission having two planetary stages.

An arrangement according to an embodiment comprises a first planetary stage and a second planetary stage. A planetary stage is a transmission stage having a ring gear, a sun gear, a planet carrier, and one or more planet gears. The planet gears are mounted rotatably in the planet carrier. Said planet gears each mesh with the sun gear and/or the ring gear. At least two of the three components out of the ring gear, planet carrier, and sun gear are mounted so as to be rotatable independently of one another about a common axis of rotation. The third component is preferably arranged fixedly with respect to a casing. In particular, the ring gear may be arranged fixedly with respect to a casing while the planet carrier and the sun gear are mounted so as to be rotatable.

The sun gear of the first planetary stage and the planet carrier of the second planetary stage are interconnected for conjoint rotation by means of a spline joint. Specifically, the sun gear and the planet carrier are mounted so as to be rotatable about a common axis of rotation. The sun gear and the planet carrier are prevented from rotating relative to one another by the spline joint. In particular, a torque can be transmitted from the sun gear to the planet carrier via the spline joint.

A spline joint, also referred to as a spline coupling, consists of an internal toothing and an external toothing. The internal toothing and the external toothing are arranged coaxially with one another, that is to say have a common central axis and axis of rotation. The internal toothing and the external toothing intermesh, such that the two toothings are connected in a form-fitting manner and for conjoint rotation.

According to an embodiment of the invention, the sun gear integrally forms the internal toothing. The sun gear and the internal toothing are in particular integrally interconnected.

The external toothing is formed integrally by a first web of the planet carrier or integrally by a sun shaft that is integrally connected to the first web. The first web, the external toothing, and optionally the sun shaft are thus integrally interconnected. In particular, the planet carrier may integrally form the external toothing. In that case, the external toothing and the planet carrier in its entirety consist of a single piece.

A web of a planet carrier is a supporting structure that forms pin seats. A pin seat is in turn a means for fixing a planet pin. The planet pins each serve for holding and mounting one planet gear. The web is distinguished by the fact that it is offset axially from the planet gears of the respective planetary stages. The web and the planet gears are thus situated on different sides of a plane which runs between the web and the planet gears and which is oriented radially, that is to say orthogonally, with respect to an axis of rotation of the at least two rotatable components of the planetary stage.

The external toothing meshes with the internal toothing. The external toothing is arranged within the internal toothing. Accordingly, the internal toothing has a greater diameter than the external toothing. This in turn makes it possible to use the sun gear and/or a sun shaft having a greater diameter. This reduces the stresses that must be handled owing to the torque to be transmitted. This creates additional degrees of freedom for the design of the transmission. For example, it is possible to transmit higher torques and/or to produce the sun shaft from a material which has a lower load capacity but which is, in exchange, less expensive. In this case, owing to the spline joint, it is nevertheless possible to use a sun gear that consists of a relatively high-strength material. By forming the first web and the sun shaft integrally, the space required for the arrangement in the axial direction is reduced.

In a preferred embodiment, there is an axial overlap between a working toothing of the sun gear and the spline joint. The working toothing is distinguished by the fact that it meshes with the toothings of one or more planet gears of the first stage. An axial overlap means that at least a part of the working toothing and at least a part of the spline joint, in particular at least a part of the internal toothing and at least a part of the external toothing, are situated between two planes which are oriented radially, that is to say orthogonally, with respect to the above-mentioned axis of rotation, the planes each being tangent to, or each intersecting, all of said toothings. The axial overlap between the working toothing and the spline joint makes it possible to form the sun shaft connected integrally to the first web and/or to the planet carrier.

In an embodiment, the sun shaft is preferably a cast part. This is advantageous because cast parts are inexpensive to produce.

In an embodiment, the sun shaft has a shoulder which forms a first axial abutment with respect to the sun gear. The shoulder is thus in contact with the sun gear and prevents the sun shaft and sun gear from being displaced relative to one another in a first axial direction.

In an embodiment, a second axial abutment is formed by a ring which is joined to the sun shaft. In particular, the ring may be screwed to the sun shaft. The ring is in contact with the sun gear and prevents the sun shaft and sun gear from being displaced relative to one another in a second direction that runs in the opposite direction to the first axial direction.

In an embodiment, the arrangement preferably has a bearing arrangement. Said bearing arrangement serves for mounting the planet carrier. Here, the planet carrier is mounted solely by means of the bearing arrangement. Furthermore, the bearing arrangement is joined solely to a second web of the planet carrier. In particular, the bearing arrangement is not joined to the first web.

The joint between the first bearing arrangement and the second web is preferably configured such that one or more outer rings of bearings of the bearing arrangement, or one or more inner rings of the bearings, are fixed in the second web.

The first web may have a floating configuration. The first web is, however, preferably supported in the planet carrier of the first planetary stage via the sun shaft and the spline joint.

The transmission illustrated in FIG. 1 is a planetary transmission having a first planetary stage 101 and a second planetary stage 103. The two planetary stages 101, 103 each comprise a ring gear 101a, 103a, a planet carrier 101b, 103b, planet gears 101c, 103c, and a sun gear 101d, 103d. The planet gears 101c, 103c mesh with the respective ring gear 101a, 103a and the respective sun gear 101d, 103d. The planet carriers 101b, 103b are each rotatably mounted in a transmission casing 105.

The planet carrier 101b of the first planetary stage 101 integrally forms an input shaft 107 of the transmission. An output shaft 109 of the transmission is integrally connected to the sun gear 103d of the second planetary stage 103. A torque that is introduced into the transmission via the input shaft 107 is transmitted to the output shaft 109 via the first planetary stage 101 and the second planetary stage 103.

A sun shaft 111 serves as a torque-conducting connection between the two planetary stages 101, 103. Said sun shaft connects the sun gear 101d of the first planetary stage 101 to the planet carrier 103b of the second planetary stage 103 for conjoint rotation. The sun shaft 111 is integrally connected to the planet carrier 103b of the second planetary stage 103. A spline joint 113 produces a connection, for conjoint rotation, between the sun shaft 111 and the sun gear 101d of the first planetary stage 101. The spline joint 113 is situated in the interior of the sun gear 101d of the first planetary stage 101 and is surrounded tangentially in the circumferential direction by the sun gear 101d.

The sun shaft 111 forms a ridge 115. Said ridge bears against the sun gear 101d of the first planetary stage 101 and thus prevents the sun shaft 111 from being displaced in a first axial direction.

An annular disk 117 is screwed to an end face of the sun shaft 111. The disk 117 bears against a corresponding shoulder of the sun gear 101d of the first planetary stage 101. This prevents the sun shaft 111 from being displaced relative to the sun gear 101d of the first planetary stage 101 in a second axial direction which is opposite to the first axial direction.

By means of the ridge 115 and the disk 117, the sun gear 101d of the first planetary stage 101 and the sun shaft 111 are thus fixed relative to one another with respect to displacements in the axial direction. By contrast, the spline joint 113 allows for slight tilting movements of the sun gear 101d of the first planetary stage 101 and of the sun shaft 111 about radial axes of rotation, that is to say axes of rotation running orthogonally with respect to a common axis of rotation of the sun gear 101d of the first planetary stage 101 and of the sun shaft 111. This makes it possible in particular to compensate for load-induced misalignments and to avoid associated inappropriate stresses.

The planet carrier 103b of the second planetary stage 103 is mounted by means of a single bearing 119, which is arranged at a generator side. The bearing 119 is arranged at a generator side proceeding from the planet gears 103c of the second planetary stage 103. At the rotor side of the bearing 119, there are no further bearings used for mounting the planet carrier 103b of the second planetary stage 103. Instead, the planet carrier 103b of the second planetary stage 103 is supported in the sun gear 101d of the first planetary stage 101 via the sun shaft 111.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

101 First planetary stage
101a Ring gear
101b Planet carrier
101c Planet gear
101d Sun gear 103 Second planetary stage
103a Ring gear
103b Planet carrier
103c Planet gear
103d Sun gear
105 Transmission casing
107 Input shaft
109 Output shaft
111 Sun shaft
113 Spline joint
115 Ridge
117 Disk
119 Bearing

The invention claimed is:

1. A wind turbine transmission comprising:
a first planetary stage; and
a second planetary stage, wherein:
a sun gear of the first planetary stage and a planet carrier of the second planetary stage are interconnected for conjoint rotation by means of a spline joint,
the sun gear integrally forms an internal toothing, a first web of the planet carrier or a sun shaft integrally connected to the first web integrally forms an external toothing of the spline joint, and
the planet carrier is mounted solely by one bearing arrangement, which is joined solely to a second web of the planet carrier.

2. The wind turbine transmission according to claim 1, wherein a working toothing of the sun gear and the spline joint axially overlaps.

3. The wind turbine transmission according to claim 1, wherein the sun shaft is cast.

4. The wind turbine transmission according to claim 1, wherein the sun shaft has a shoulder which forms a first axial abutment with respect to the sun gear.

5. The wind turbine transmission according to claim 1, wherein a ring is joined to the sun shaft and forms a second axial abutment with respect to the sun gear.

6. The wind turbine transmission according to claim 1, wherein the external toothing and the planet carrier in its entirety consists of a single piece.

7. The wind turbine transmission according to claim 5, wherein the ring is screwed to an end face of the sun shaft.

* * * * *